(12) United States Patent
Andreopoulos et al.

(10) Patent No.: US 12,554,978 B2
(45) Date of Patent: Feb. 17, 2026

(54) HORIZONTAL AND VERTICAL ASSERTIONS FOR VALIDATION OF NEUROMORPHIC HARDWARE

(71) Applicant: INTERNATIONAL BUSINESS MACHINES CORPORATION, Armonk, NY (US)

(72) Inventors: Alexander Andreopoulos, San Jose, CA (US); Dharmendra S. Modha, San Jose, CA (US); Carmelo Di Nolfo, San Jose, CA (US); Myron D. Flickner, San Jose, CA (US); Andrew Stephen Cassidy, Austin, TX (US); Brian Seisho Taba, San Jose, CA (US); Pallab Datta, San Jose, CA (US); Rathinakumar Appuswamy, San Jose, CA (US); Jun Sawada, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 981 days.

(21) Appl. No.: 17/077,709

(22) Filed: Oct. 22, 2020

(65) Prior Publication Data
US 2022/0129742 A1    Apr. 28, 2022

(51) Int. Cl.
*G06N 3/08*        (2023.01)
*G06F 16/23*       (2019.01)

(52) U.S. Cl.
CPC ........... *G06N 3/08* (2013.01); *G06F 16/2379* (2019.01)

(58) Field of Classification Search
CPC .............................. G06N 3/08; G06F 16/2379
See application file for complete search history.

(56) References Cited

U.S. PATENT DOCUMENTS

| 9,021,409 B2 | 4/2015 | Vasudevan et al. |
| 9,075,935 B2 | 7/2015 | Vasudevan et al. |

(Continued)

FOREIGN PATENT DOCUMENTS

| CN | 114386564 A | 4/2022 |
| DE | 102021123287 A1 | 4/2022 |

(Continued)

OTHER PUBLICATIONS

Lee et al., "Coverage Driven Verification Methodology for Asynchronous Neuromorphic Routers", 2019 (Year: 2019).*

(Continued)

*Primary Examiner* — Omar F Fernandez Rivas
*Assistant Examiner* — Shamcy Alghazzy
(74) *Attorney, Agent, or Firm* — Amin, Turocy & Watson, LLP

(57) ABSTRACT

Simulation and validation of neural network systems is provided. In various embodiments, a description of an artificial neural network is read. A directed graph is constructed comprising a plurality of edges and a plurality of nodes, each of the plurality of edges corresponding to a queue and each of the plurality of nodes corresponding to a computing function of the neural network system. A graph state is updated over a plurality of time steps according to the description of the neural network, the graph state being defined by the contents of each of the plurality of queues. Each of a plurality of assertions is tested at each of the plurality of time steps, each of the plurality of assertions being a function of a subset of the graph state. Invalidity of the neural network system is indicated for each violation of one of the plurality of assertions.

20 Claims, 11 Drawing Sheets

(56) References Cited

U.S. PATENT DOCUMENTS

| | | | |
|---|---|---|---|
| 2014/0019929 A1 | 1/2014 | Raviv et al. | |
| 2018/0189638 A1 | 7/2018 | Nurvitadhi et al. | |
| 2019/0005382 A1* | 1/2019 | Li | G06N 3/08 |
| 2019/0057310 A1* | 2/2019 | Olmstead | G06F 40/30 |
| 2019/0132344 A1* | 5/2019 | Lem | G06N 20/00 |
| 2019/0230107 A1* | 7/2019 | De Sapio | H04L 63/145 |
| 2019/0304157 A1* | 10/2019 | Amer | G06V 40/23 |
| 2019/0354870 A1 | 11/2019 | Odena | |
| 2020/0005155 A1 | 1/2020 | Datta et al. | |
| 2020/0074246 A1* | 3/2020 | Goyal | G06N 3/088 |
| 2021/0073169 A1* | 3/2021 | Wang | G06N 3/063 |
| 2022/0019882 A1* | 1/2022 | Miramond | G06N 3/049 |
| 2022/0121925 A1* | 4/2022 | Amir | G06F 17/10 |

FOREIGN PATENT DOCUMENTS

| | | |
|---|---|---|
| GB | 2604963 A | 9/2022 |
| JP | 2001-051968 A | 2/2001 |
| JP | 2022-068847 A | 5/2022 |

OTHER PUBLICATIONS

Scarselli et al., "The Graph Neural Network Model", 2009 (Year: 2009).*
Wang et al., "Accelerating Coverage Directed Test Generation for Functional Verification: A Neural Network-based Framework", 2018 (Year: 2018).*
Sampson et al., "Expressing and Verifying Probabilistic Assertions", 2014 (Year: 2014).*
Dot-product engine for neuromorphic computing (Year: 2016).*
Lu et al., "Neural Network Branching for Neural Network Verification" arXiv, 24 pages (2019).
United Kingdom Search and Examination Report for Application No. GB2114617.0 dated Sep. 12, 2023.
Ding et al., "StructuredWeight Matrices-Based Hardware Accelerators in Deep Neural Networks: FPGAs and ASICs," In Proceedings of the 2018 on Great Lakes Symposium on VLSI (pp. 353-358). ACM (2018).
Huang et al., "Statistical Assertions for Validating Patterns and Finding Bugs in Quantum Programs," In Proceedings of the 46th International Symposium on Computer Architecture (pp. 541-553). ACM (2019).
Kubica et al., "Supporting hardware assisted verification with synthesizable assertions," In Proceedings of IP Embedded System Conference, Grenoble, Retrieved from https://www.design-/32569/supporting-hardware-assisted-verification-with-synthesizable-assertions.html (2012).
Lee et al., "Message Sequence Charts for Assertion-based Verification," CECS Technical Report. Retrieved from http://cecs.uci.edu/files/2013/10/TR-13-13.pdf (2013).
Response to Examination Report for GB Application No. 2114617.0 dated Jun. 12, 2023.
Jung et al., "A verification Framework of Neural Processing Unit for super resolution," 20th International Workshop on Microprocessor/SOC Test, Security and Verification (MTV), IEEE: 13-17 (2019).
Klaiber et al., "An End-to-End HW/SW Co-Design Methodology to Design Efficient Deep Neural Network Systems using Virtual Models," Cornell University Library, arXiv: 5 pages (2019).
Lee et al., "NNsim: A Fast and Accurate SystemC/TLM Simulator for Deep Convolutional Neural Network Accelerators," International Symposium on VLSI Design, Automation and Test (VLSI-DAT), IEEE: 1-4 (2019).
United Kingdom Search and Examination Report for United Kingdom Application No. GB2114617.0 dated Jul. 7, 2022.
Wang et al., "Spatial Data Dependence Graph Simulator for Convolutional Neural Network Accelerators," IEEE International Conference on Artificial Intellegence Circuits and Systems (AICAS), IEEE, 309-310 (2019).
Response to Examination Report for GB Application No. 2114617.0 dated Jan. 6, 2023.
United Kingdom Search Report for Application No. GB2114617.0 dated Apr. 11, 2023.
Japan Patent Office, "Notice of Reasons for Refusal" Mar. 11, 2025, 06 Pages, JP Application No. 2021-170695.
The State Intellectual Property Office of People's Republic of China, "Second Office Action", Jun. 14, 2025, 11 Pages, CN Application No. 202111213042.X.
The State Intellectual Property Office of People's Republic of China, "First Office Action", Mar. 3, 2025, 10 Pages, CN Application No. 202111213042.X.

* cited by examiner

HORIZONTAL AND VERTICAL ASSERTIONS FOR VALIDATION OF NEUROMORPHIC HARDWARE

STATEMENT REGARDING FEDERALLY SPONSORED RESEARCH OR DEVELOPMENT

This invention was made with government support under FA8750-18-C-0015 awarded by U.S. Air Force, Office of Scientific Research. The government has certain rights to this invention.

BACKGROUND

Embodiments of the present disclosure relate to neural network processing, and more specifically, to a horizontal and vertical assertions for validation of neuromorphic hardware.

BRIEF SUMMARY

According to embodiments of the present disclosure, methods of and computer program products for simulating and validating a neural network system are provided. In various embodiments, a description of an artificial neural network is read. A directed graph is constructed comprising a plurality of edges and a plurality of nodes, each of the plurality of edges corresponding to a queue and each of the plurality of nodes corresponding to a computing function of the neural network system. A graph state is updated over a plurality of time steps according to the description of the neural network, the graph state being defined by the contents of each of the plurality of queues. Each of a plurality of assertions is tested at each of the plurality of time steps, each of the plurality of assertions being a function of a subset of the graph state. Invalidity of the neural network system is indicated for each violation of one of the plurality of assertions.

DETAILED DESCRIPTION

Figure 1:
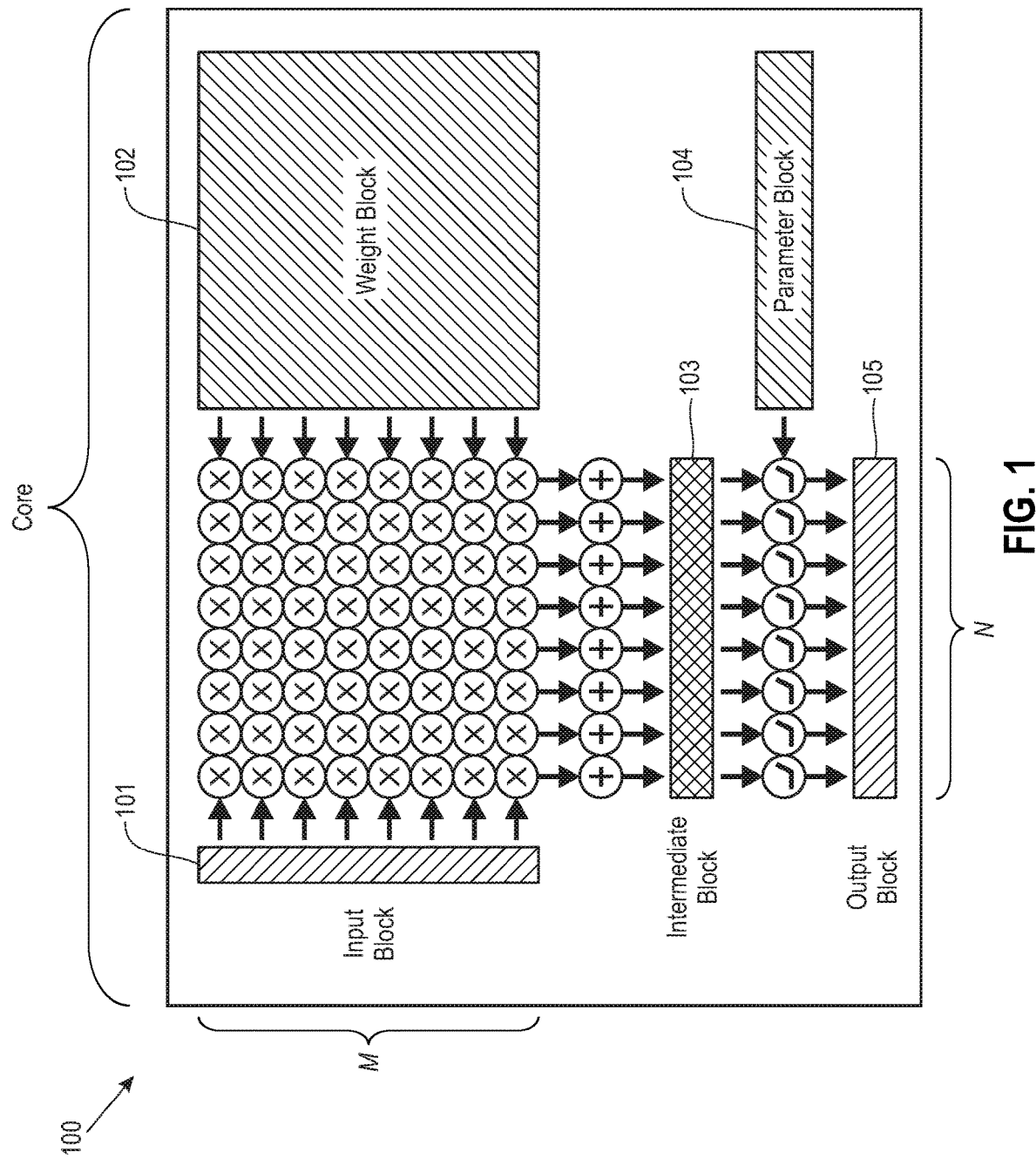
FIG. 1 illustrates a neural core according to embodiments of the present disclosure.

An artificial neuron is a mathematical function whose output is a nonlinear function of a linear combination of its inputs. Two neurons are connected if the output of one is an input to the other. A weight is a scalar value encoding the strength of the connection between the output of one neuron and the input of another neuron.

A neuron computes its output, called an activation, by applying a nonlinear activation function to a weighted sum of its inputs. A weighted sum is an intermediate result computed by multiplying each input with the corresponding weight and accumulating the products. A partial sum is a weighted sum of a subset of inputs. A weighted sum of all inputs may be computed in stages by accumulating one or more partial sums.

A neural network is a collection of one or more neurons. A neural network is often divided into groups of neurons called layers. A layer is a collection of one or more neurons that all receive input from the same layers and all send output to the same layers, and typically perform a similar function. An input layer is a layer that receives input from a source outside the neural network. An output layer is a layer that sends output to a target outside the neural network. All other layers are intermediate processing layers. A multilayer neural network is a neural network with more than one layer. A deep neural network is a multilayer neural network with many layers.

A tensor is a multidimensional array of numerical values. A tensor block is a contiguous subarray of the elements in a tensor.

Each neural network layer is associated with a parameter tensor V, weight tensor W, input data tensor X, output data tensor Y, and intermediate data tensor Z. The parameter tensor contains all of the parameters that control neuron activation functions a in the layer. The weight tensor contains all of the weights that connect inputs to the layer. The input data tensor contains all of the data that the layer consumes as input. The output data tensor contains all of the data that the layer computes as output. The intermediate data tensor contains any data that the layer produces as intermediate computations, such as partial sums.

The data tensors (input, output, and intermediate) for a layer may be 3-dimensional, where the first two dimensions may be interpreted as encoding spatial location and the third dimension as encoding different features. For example, when a data tensor represents a color image, the first two dimensions encode vertical and horizontal coordinates within the image, and the third dimension encodes the color at each location. Every element of the input data tensor X can be connected to every neuron by a separate weight, so the weight tensor W generally has 6 dimensions, concatenating the 3 dimensions of the input data tensor (input row a, input column b, input feature c) with the 3 dimensions of the output data tensor (output row i, output column j, output feature k). The intermediate data tensor Z has the same shape as the output data tensor Y. The parameter tensor V concatenates the 3 output data tensor dimensions with an additional dimension o that indexes the parameters of the activation function $\sigma$. In some embodiments, activation function $\sigma$ requires no additional parameters, in which case the additional dimension is unnecessary. However, in some embodiments, activation function $\sigma$ requires at least one additional parameter, which appears in dimension o.

An element of a layer's output data tensor Y can be computed as in Equation 1 where the neuron activation function σ is configured by the vector of activation function parameters V [i, j, k,:], and the weighted sum Z[i,j,k] can be computed as in Equation 2.

$$Y[i, j, k] = \sigma(V[i, j, k, :]; Z[i, j, k]) \qquad \text{Equation 1}$$

$$Z[i, j, k] = \sum_{a=1}^{A}\sum_{b=1}^{B}\sum_{c=1}^{C} W[i, j, k, a, b, c] \cdot X[a, b, c] \qquad \text{Equation 2}$$

For simplicity of notation, the weighted sum in Equation 2 may be referred to as the output, which is equivalent to using a linear activation function Y[i,j, k]=σ(Z [i, j, k])=Z [i,j,k], with the understanding that the same statements apply without loss of generality when a different activation function is used.

In various embodiments, computation of the output data tensor as described above is decomposed into smaller problems. Each problem may then be solved on one or more neural core, or on one or more core of a conventional multicore system in parallel.

It will be apparent from the above that neural networks are parallel structures. Neurons in a given layer receive inputs, X with elements $x_i$ from one or more layers or other inputs. Each neuron computes its state, y∈ Y based on the inputs and weights W with elements $w_i$. In various embodiments, the weighed sum of inputs is adjusted by a bias b, and then the result is passed to a nonlinearity F(·). For example, a single neuron activation may be expressed as $$y = F\!\left(b + \sum x_i w_i\right).$$

Because all neurons in a given layer receive inputs from the same layers and compute their outputs independently, neuron activations can be computed in parallel. Because of this aspect of the overall neural network, performing computation in parallel distributed cores accelerates overall computation. Further, within each core vector operations can be computed in parallel. Even with recurrent inputs, for example when a layer projects back to itself, all neurons are still updated simultaneously. Effectively, the recurrent connections are delayed to align with a subsequent input to the layer.

With reference now to FIG. 1, a neural core according to embodiments of the present disclosure is depicted. A neural core 100 is a tileable computational unit that computes one block of an output tensor. A neural core 100 has M inputs and N outputs. In various embodiments, M=N. To compute an output tensor block, a neural core multiplies an M×1 input tensor block 101 with an M×N weight tensor block 102 and accumulates the products into weighted sums that are stored in a 1×N intermediate tensor block 103. A O×N parameter tensor block contains the O parameters 104 that specify each of the N neuron activation functions that are applied to the intermediate tensor block 103 to produce a 1×N output tensor block 105.

Multiple neural cores may be tiled in a neural core array. In some embodiments, the array is 2-dimensional.

A neural network model is a set of constants that collectively specify the entire computation performed by a neural network, including the graph of connections between neurons as well as the weights and activation function parameters for every neuron. Training is the process of modifying the neural network model to perform a desired function. Inference is the process of applying a neural network to an input to produce an output, without modifying the neural network model.

An inference processing unit is a category of processors that perform neural network inference. A neural inference chip is a specific physical instance of an inference processing unit.

Figure 2:
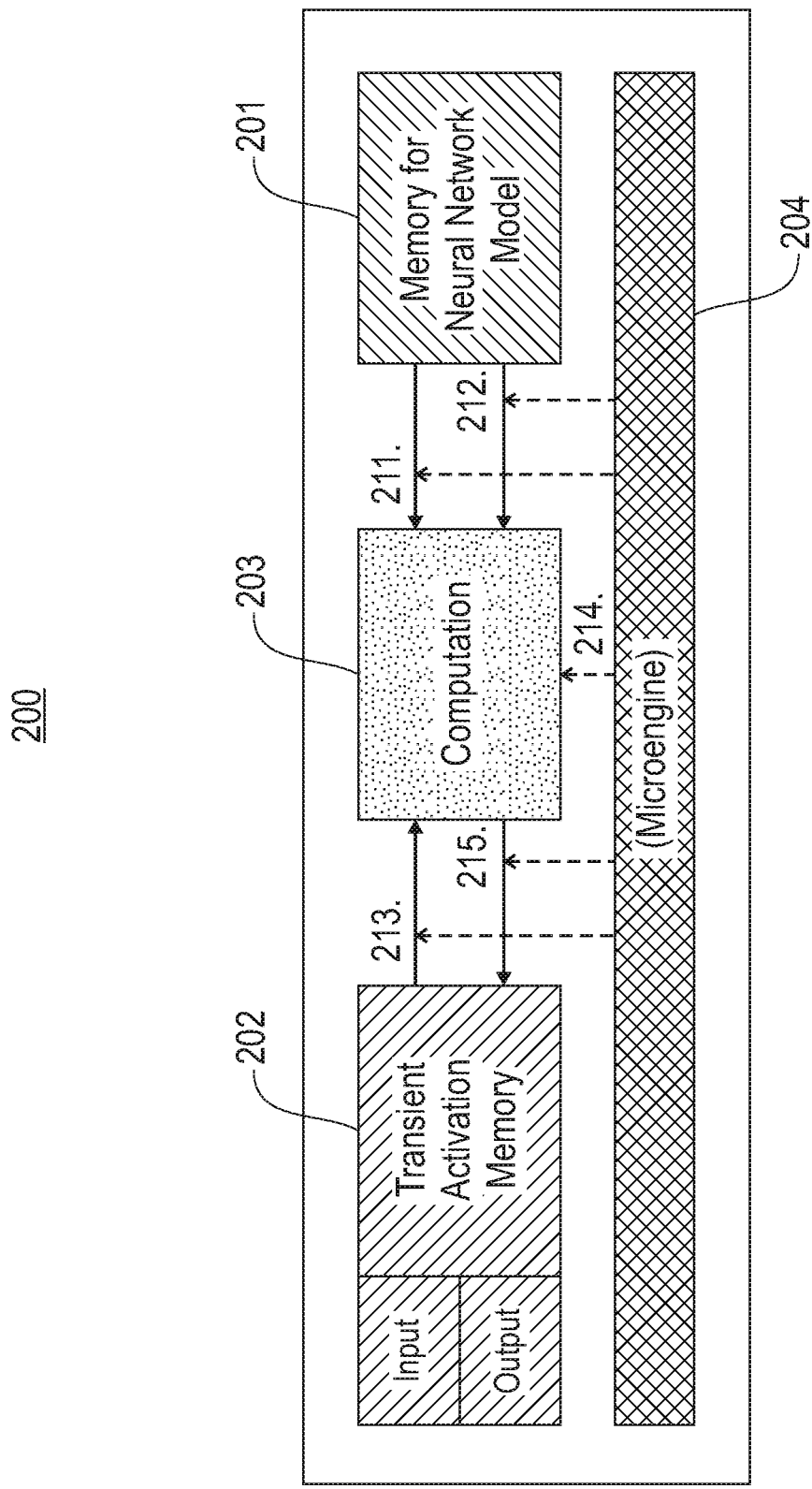
FIG. 2 illustrates an exemplary Inference Processing Unit (IPU) according to embodiments of the present disclosure.

Referring to FIG. 2, an exemplary Inference Processing Unit (IPU) is illustrated according to embodiments of the present disclosure. IPU 200 includes a memory 201 for the neural network model. As described above, the neural network model may include the synapse weights for a neural network to be computed. IPU 200 includes an activation memory 202, which may be transient. Activation memory 202 may be divided into input and output regions, and stores neuron activations for processing. IPU 200 includes a neural computation unit 203, which is loaded with a neural network model from model memory 201. Input activations are provided from activation memory 202 in advance of each computation step. Outputs from neural computation unit 203 are written back to activation memory 202 for processing on the same or another neural computation unit.

In various embodiments a microengine 204 is included in IPU 200. In such embodiments, all operations 211-215 in the IPU are directed by the microengine. As set out below, central and/or distributed microengines may be provided in various embodiments. A global microengine may be referred to as a chip microengine, while a local microengine may be referred to as a core microengine or local controller. In various embodiments a microengine comprises one or more microengines, microcontrollers, state machines, CPUs, or other controllers.

Figure 3:
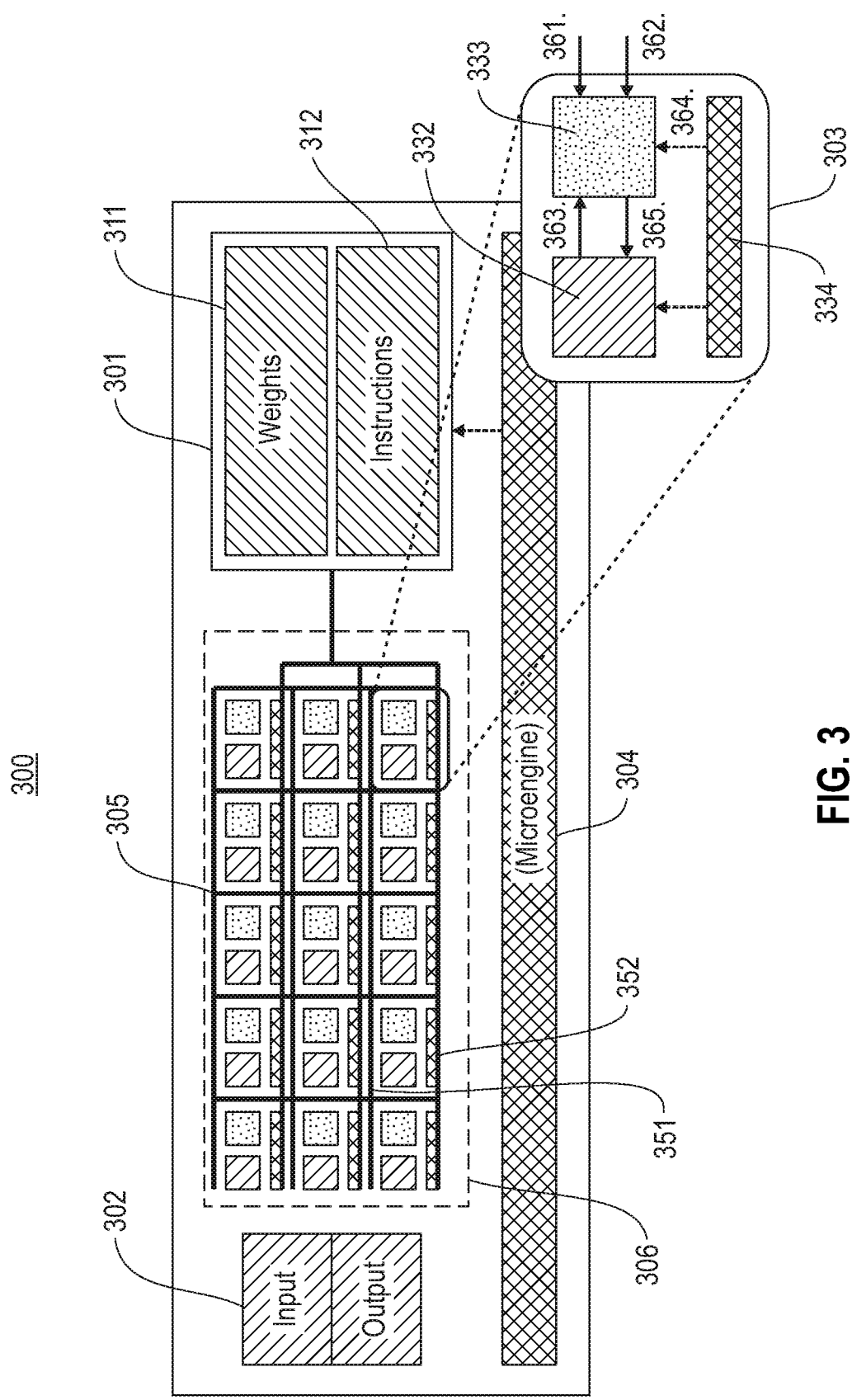
FIG. 3 illustrates a multi-core Inference Processing Unit (IPU) according to embodiments of the present disclosure.

Referring to FIG. 3, a multi-core Inference Processing Unit (IPU) is illustrated according to embodiments of the present disclosure. IPU 300 includes a memory 301 for the neural network model and instructions. In some embodiments, memory 301 is divided into weight portion 311 and instruction portion 312. As described above, the neural network model may include the synapse weights for a neural network to be computed. IPU 300 includes an activation memory 302, which may be transient. Activation memory 302 may be divided into input and output regions, and stores neuron activations for processing.

IPU 300 includes an array 306 of neural cores 303. Each core 303 includes a computation unit 333, which is loaded with a neural network model from model memory 301 and is operative to perform vector computation. Each core also includes a local activation memory 332. Input activations are provided from local activation memory 332 in advance of each computation step. Outputs from computation unit 333 are written back to activation memory 332 for processing on the same or another computation unit.

IPU 300 includes one or more network-on-chip (NoC) 305. In some embodiments, a partial sum NoC 351 interconnects the cores 303 and transports partial sums among them. In some embodiments, a separate parameter distribution NoC 352 connects cores 303 to memory 301 for distributing weights and instructions to cores 303. It will be appreciated that various configurations of NoC 351 and 352 are suitable for use according to the present disclosure. For example, broadcast networks, row broadcast networks, tree networks, and switched networks may be used.

In various embodiments a global microengine 304 is included in IPU 300. In various embodiments, a local core controller 334 is included on each core 303. In such embodiments, the global microengine (chip microengine) and the local core controller (core microengine) collaboratively direct operations. In particular, at 361, compute instructions are loaded from instruction portion 312 of model memory 301 to the core controller 334 on each core 303 by global microengine 304. At 362, parameters (e.g., neural network/synaptic weights) are loaded from weight portion 311 of model memory 301 to the neural computation unit 333 on each core 303 by global microengine 304. At 363, neural network activation data are loaded from activation local activation memory 332 to neural computation unit 333 on each core 303 by local core controller 334. As noted above, the activations are provided to the neurons of the particular neural network defined by the model, and may originate from the same or another neural computation unit, or from outside the system. At 364, neural computation unit 333 performs the computation to generate output neuron activations as directed by local core controller 334. In particular, the computation comprises applying the input synaptic weights to the input activations. It will be appreciated that various methods are available for performing such computations, including in silico dendrites, as well as vector multiplication units. At 365, the results from computation are stored in local activation memory 332 as directed by local core controller 334. As described above, these stages may be pipelined, in order to provide efficient usage of the neural computation unit on each core. It will also be appreciated that inputs and outputs may be transferred from local activation memory 332 to global activation memory 302 according to the requirements of a given neural network.

Accordingly, the present disclosure provides for runtime control of operations in an Inference Processing Unit (IPU). In some embodiments, the microengine is centralized (single microengine). In some embodiments, the IPU computation is distributed (performed by an array of cores). In some embodiments, runtime control of operations is hierarchical—both a central microengine and distributed microengines participate.

The microengine or microengines direct the execution of all operations in the IPU. Each microengine instruction corresponds to several sub-operations (e.g., address generation, load, compute, store, etc.) Core microcode is run on the core microengines (e.g., 334). In the case of local computation, the core microcode includes instruction(s) to execute a full, single tensor operation. For example, a convolution between a weight tensor and a data tensor. In the case of distributed computation, the core microcode includes instruction(s) to execute a single tensor operation on the locally stored subset of the data tensor (and partial sums). Chip microcode is run on the chip microengine (e.g., 304). Microcode includes instructions to execute all of the tensor operations in a neural network.

Figure 4:
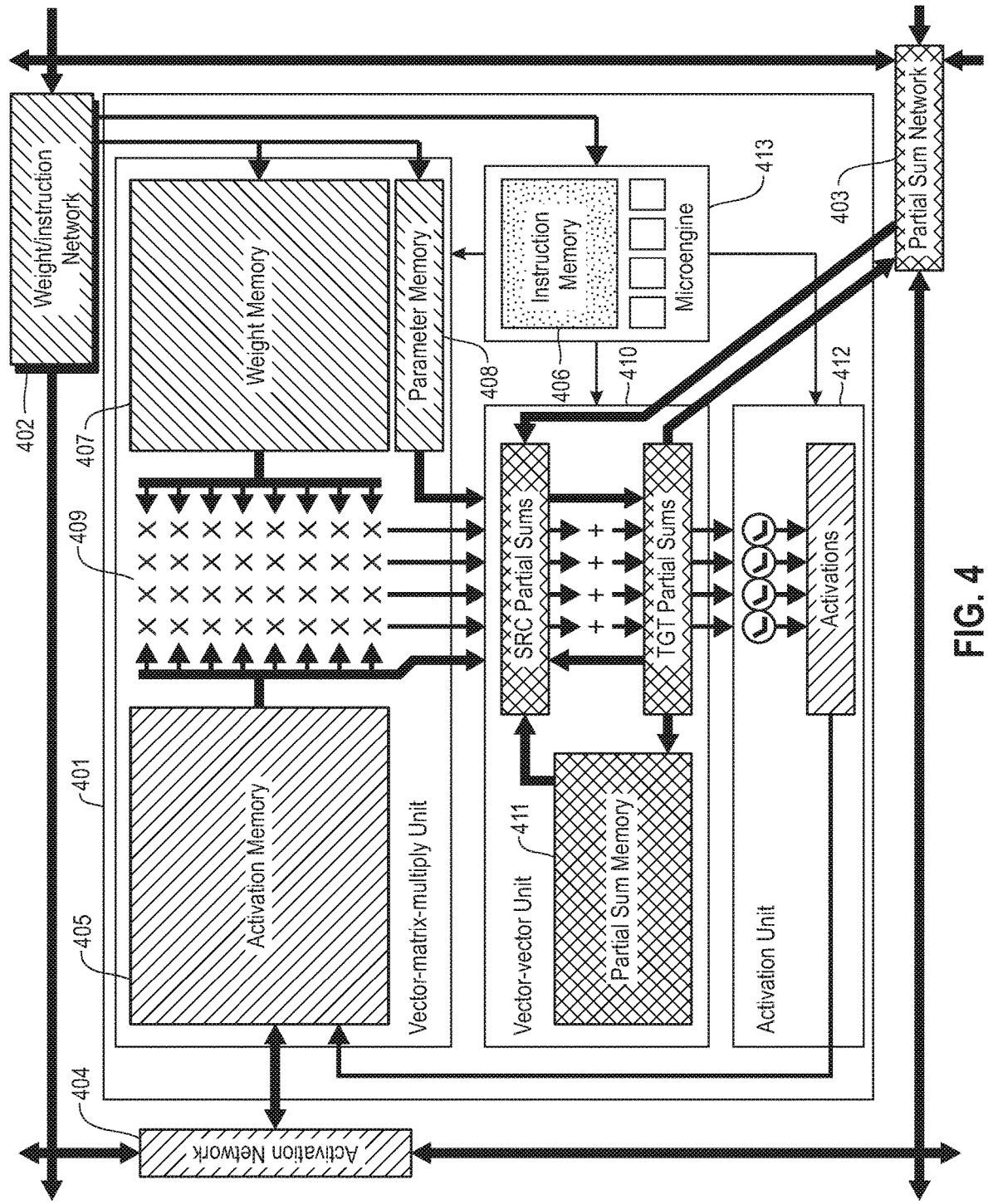
FIG. 4 illustrates a neural core and associated networks according to embodiments of the present disclosure.

With reference now to FIG. 4, an exemplary neural core and associated networks are illustrated according to embodiments of the present disclosure. Core 401, which may be embodied as described with reference to FIG. 1 is interconnected with additional cores by networks 402 . . . 404. In this embodiments, network 402 is responsible for distributing weights and/or instructions, network 403 is responsible for distributing partial sums, and network 404 is responsible for distributing activations. However, it will be appreciated that the various embodiments of the present disclosure may combine these networks, or further separate them into multiple additional networks.

Input activations (X) are distributed core 401 from off-core via activation network 404 to activation memory 405. Layer instructions are distributed to core 401 from off-core via weight/instruction network 402 to instruction memory 406. Layer weights (W) and/or parameters are distributed to core 401 from off-core via weight/instruction network 402 to weight memory 407 and/or parameter memory 408.

The weight matrix (W) is read from weight memory 407 by Vector Matrix Multiply (WM) unit 409. The activation vector (V) is read from activation memory 405 by Vector Matrix Multiply (WM) unit 409. Vector Matrix Multiply (WM) unit 409 then computes vector-matrix multiplication $Z=X^T W$ and provides the result to Vector-Vector unit 410. Vector-Vector unit 410 reads additional partial sums from partial sum memory 411, and receives additional partial sums from off-core via partial sum network 403. A vector-vector operation is computed by Vector-Vector unit 410 from these source partial sums. For example, the various partial sums may in turn be summed. The resulting target partial sums are written to partial sum memory 411, sent off-core via partial sum network 403, and/or fed back for further processing by Vector-Vector unit 410.

The partial sum results from Vector-Vector unit 410, after all computation for a given layer's inputs is complete, are provided to activation unit 412 for the computation of output activations. The activation vector (Y) is written to activation memory 405. Layer activations (including the results written to activation memory) are redistributed across cores from activation memory 405 via activation network 404. Upon receipt, they are written to local activation memory to each receiving core. Upon completion of processing for a given frame, the output activations are read from activation memory 405 and sent off-core via network 404.

Accordingly, in operation, a core control microengine (e.g., 413) orchestrates the data movement and computation of the core. The microengine issues a read activation memory address operation to load an input activation block into the vector-matrix multiply unit. The microengine issues a read weight memory address operation to load a weight block into the vector-matrix multiply unit. The microengine issues the vector-matrix multiply unit a compute operation, causing the vector-matrix multiply unit to compute a partial sum block.

The microengine issues one or more of a partial sum read/write memory address operation, vector compute operation, or partial sum communication operation in order to do one or more of the following: read partial sum data from partial sum sources; compute using partial sums arithmetic units; or write partial sum data to partial sum targets. Writing partial sum data to partial sum targets may include communicating external to the core via the partial sum network interface or sending partial sum data to the activation arithmetic unit.

The microengine issues an activation function compute operation, such that the activation function arithmetic unit computes an output activation block. The microengine issues a write activation memory address and the output activation block is written to the activation memory via the activation memory interface.

Accordingly, a variety of sources, targets, address types, computation types, and control components are defined for a given core.

Sources for vector-vector unit 410 include Vector Matrix Multiply (VMM) unit 409, constants from parameter memory 408, partial sum memory 411, partial sum results from prior cycles (TGT partial sums); and partial sum network 403.

Targets for vector-vector unit 410 include partial sum memory 411, partial sum results for subsequent cycles (SRC partial sums), activation unit 412, and partial sum network 403.

Accordingly, a given instruction may read or write from activation memory 405, read from weight memory 407, or read or write from partial sum memory 411. Compute operations performed by the core include vector matrix multiplication by VMM unit 409, vector (partial sum) operations by vector-vector unit 410, and activation functions by activation unit 412.

Control operations include updating program counters and loop and/or sequence counters.

Thus, memory operations are issued to read weights from addresses in weight memory, read parameters from addresses in parameter memory, read activations from addresses in activation memory, and read/write partial sums to addresses in partial sum memory. Computation operations are issued to perform vector-matrix multiplication, vector-vector operations, and activation functions. Communication operations are issued to select the vector-vector operands, route messages on the partial sum network, and select partial sum targets. Loops over layer outputs and loops over layer inputs are controlled by control operations specifying program counters, loop counters, and sequence counters in microengines.

Data distribution can be provided from a global memory array according to embodiments of the present disclosure. Global memory array includes a plurality of elements, each comprising a memory element and a buffer. Weights and instructions are provided from global array to array of cores via network. An exemplary configuration of cores is discussed above with regard to FIG. 3. Memory 303 in FIG. 3 may be implemented as described in connection with global memory array.

As set out above, a many core architecture for neural inference provides a significant advantage in computing power. However, if the neural network weights and parameters are not provided to computation cores on time, the cores cannot perform any useful computation. As a result, the performance of a neural chip may be limited by the capability of delivering neural network weights and parameters to computation cores on the chip. On-chip memory greatly improves the memory bandwidth compared to typical off-chip memory such as Dynamic Random-Access Memory (DRAM) or High Bandwidth Memory (HBM). Moreover, on-chip memory is more energy-efficient than off-chip memory, leading to a more power-efficient neural inference system. In various embodiments, the on-chip memory may comprise Static Random-Access Memory (SRAM) or other embedded memories. However, delivering neural network weights to cores at the rate commensurate with the processing speed remains a challenge.

Particular efficiencies may be realized with Convolutional Neural Networks (CNN). In CNNs, the same weight matrix (sometimes referred to as a convolutional filter) is repeatedly used. To minimize the amount of on-chip memory used, it is preferable to store a given weight matrix in one place with no duplication. In order to store a large neural network, some embodiments of the on-chip memory consist of a collection of many memory elements. It will also be appreciated that the many cores are the target of the memory weights. This result in a many-to-many communication problem (many memory elements to many cores). The broadcasting of weights can create network-on-chip (NoC) congestion, and may create a number of conflicts and pipeline stalls, leading to degradation of broadcasting bandwidth.

As outlined above, in various embodiments of a neural inference chip, a grid of neural inference cores is provided to accelerate neural network inference. In various embodiments, prescheduling of instructions is provided. Neural network evaluation involves a regular pattern of computation, and so instructions can be prescheduled without any stalls in order to achieve high performance. However, it is preferred that all the neural network weights are delivered to the cores just-in-time as prescheduled. If the weight delivery network is congested and weight delivery stalls, the prescheduling of neural network evaluation fails.

The present disclosure provides for a stall-less weight delivery network-on-chip to deliver weight parameters from a grid of memory elements to a grid of computation cores. The one dimensional scheme is first shown below, and then extended to a two-dimensional grid scheme. These approaches are further extended to support different various weight distribution such as striping (where different rows of cores get different weights).

The approaches described herein work without conflict even if the time to deliver instruction to the memory element and deliver data from the memory element to computing cores varies. These approaches address instruction flow that can access any column at any order. The new schemes remove the constraint that all columns start at the same time.

In accordance with an aspect of the disclosure, deep-learning and deep-inference neural network are widely used for various applications and work-loads that are hard to be solved by traditional microprocessors. These networks can be greatly accelerated using special hardware called neural network accelerators or neural inference accelerators. In some instances, these accelerators do not have a traditional sequentially executing instruction streams. Instead, a neural inference accelerator often includes many components moving in parallel, where each moving component can be pipelined, thereby making a queue structure. In other words, inputs to the unit comes out after a number of cycles have iterated and post processing. The output of one object can be an input to another object. This effectively creates a graph structure of objects and queues. Since there is no traditional model of sequentially executing instructions, the verification of the accelerators with many parallel moving objects is complex and error prone. Accordingly, the present disclosure provides a unique approach to design and verify the network of objects by defining vertically and horizontally assertions in time and spatial dimensions. These assertions defines how the machine is working, and effectively replaces the traditional view of the sequential instructions.

In accordance with an aspect of the disclosure, a combination of horizontal and vertical assertions are provided. Horizontal assertions include a set of concepts whose Boolean output depends exclusively on the current observable state of the validator. Vertical assertions include a set of concepts whose Boolean output depends on the past (and possibly current) observed state of the validator. When an assertion fails, it denotes an invalid/unexpected state in the validator warranting further investigation.

An exemplary horizontal assertion includes a Vector-by-matrix multiplication (VMM) unit. For the VMM unit to do a matrix multiplication it needs to receive in the same cycle a VMM operation (Op), an Activation packet from unified memory and a Weight packet from the Weight Buffer. At each cycle the three corresponding input queues of the VMM unit can be queried to make sure that either all three queues contain valid values in the current cycle, or all three queues do not contain valid values. The latter case occurs typically near the beginning of the simulation when the first few ops/packets have not arrived yet. This configuration can be instrumental in detecting timing issues/mistakes in the network of queue delays. An exemplary vertical assertion includes a VMM unit as discussed above, where during execution it receives VMM operations, Activation packets and Weight packets.

The present disclosure provides a way to validate that when such a multitude, e.g. triple, of packets arrives there has not been a mix-up or improper ordering/delivery of the packets. For example, the present disclosure verifies that the system is not trying to use a VMM operation that was targeted to be used with an Activation packet targeted to be used with a different VMM operation. In some embodiments, this verification entails adding metadata information to each queue element X, which is in turn passed along/appended to the metadata of all new queue outputs which depend on X.

In this exemplary embodiment, in the VMM thread when a VMM operation, activation read address and weight buffer read address is generated, a counter value N can be included indicating the matrix multiplication number in the VMM unit for which this triple of data is targeted. By the time the VMM operation, Activation packet and Weight packet arrives in the VMM unit, the metadata is parsed to make sure that the counter values in these three packets match. Thus, the process can be thought as a MD5 hash-like approach for ensuring that nothing has been corrupted in the pipelines, where instead of passing a simple integer value N, a large hash value (128 bits for example) can be passed and checked for a match. For example, in the simulator, this can be useful to detect race conditions where one might accidentally be using the wrong queue outputs. This is also beneficial in that it can detect memory corruption issues early in the pipeline, which can involve making sure that all new hashes are functions of all the previous hashes they depend on. Some embodiments include an option to disable vertical assertions on a per component basis (e.g., via specification in the simulation.json file) as they can require extensive memory resources and slow performance.

Figure 5:
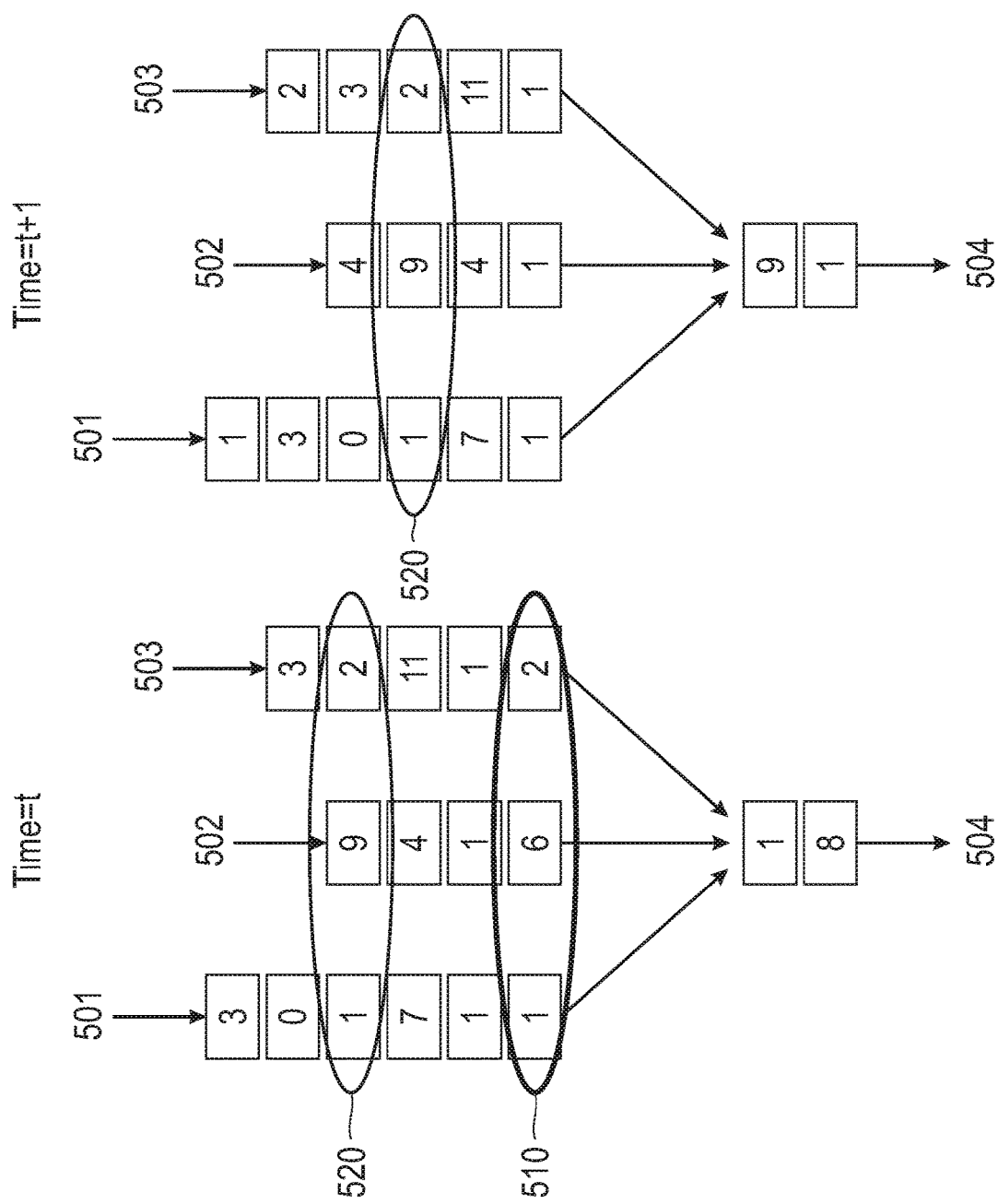
FIG. 5 is an exemplary schematic view of horizontal and vertical assertion according to embodiments of the present disclosure.

FIG. 5 provides a graphical illustration of a horizontal and vertical assertion in accordance with the present disclosure. As shown three queues 501-503 are supplied, each with different length delays, are all feeding their added values into a fourth queue 504. The contents of each queue is shown at two time instances "t" and later in time at "t+1". As shown, the queue contents get shifted from t to t+1 after the head of each queue gets advanced and aggregated into the fourth queue 504. For example, the head of the three queues 501-503 at time "t" (denoted by ellipsoid 510) are combined such that the 1+6+2=9, which is shown as the tail of the fourth queue 504 at time t+1. As the head of each queue 501-503 is combined into queue 504, new data is written to the tail of each queue 501-503.

In accordance with the present disclosure, a horizontal assertion compares the data across a single time instant, and can evaluate whether that data meet a predefined condition. In the exemplary embodiment of FIG. 5, at time t we show a horizontal assert 510 that checks that all queue heads have a sum less than 30. In this case 1+6+2=9, which is less than 30, so the assertion does not fail.

In accordance with the present disclosure, a vertical assert compares the data across time instants. In the exemplary embodiment shown in FIG. 5, a vertical assertion (denoted by ellipsoid 520) is depicted both at time t, and later in time at t+1, comparing the data elements at the three queues after the queues have advanced by one cycle. This assertion checks that the queues 501-503 are working properly and the data gets propagated properly in the queues 501-503. In this case, the assertion does not fail since the values (1, 9, 2) get propagated properly in the next cycle. Moreover, a confirmation the values in any given vertical assertion 520 (illustrated as a row across the three queues) are propagated correctly, also provides by extension, a confirmation that the preceding and/or following rows have also propagated correctly. For example, as the values 1, 9, 2 of vertical assertion 520 are confirmed to have advanced one increment at time t+1, one can deduce that the preceding row (having values 7, 4, 11) has likewise advanced one increment at time t+1.

The present disclosure provides per cycle simulation of the neuromorphic (e.g. NorthPole) hardware. Each time the advance_cycle( ) function is invoked the state of the simulation in the next cycle can be calculated. A composition of components (similar to TrueNorth corelets) can be included, where each component outputs a set of queues, and receives as input pointers corresponding to the output queues of other components. In some embodiments, queues can be implemented in C++ as circular buffers with a certain delay. Operation (Op) queue delay can encode the delay till the Op is executed and data queue delay encodes the delay till output data is delivered to its destination. At each cycle, each component reads the head of its input queues, processes that data and writes the result to the tail of its output queues.

For example, delay N queue has N+1 elements (read/write can be done in different queue elements), thus for parallelization purposes any two components, even if they are nested inside of each other, can be computed in parallel during each cycle, since they operate on different data elements. Accordingly, the resulting NorthPole simulator can include thousands of queues. Thus, the addition of assertions as provided in the present disclosure in the code is beneficial to validate correctness of the code.

In accordance with an aspect of the present disclosure, the simulation can model the evolution of the hardware state per cycle. For example, by probing the queues at each cycle and comparing the C++ implementation with the Verilog code, a validation of the hardware implementation can be provided. Additionally, the simulator described herein provides a validation of the upstream software by confirming the correctness of numerous components, including but not limited to: the NP-PyTorch framework, the hand-coded assembly code implementing various layers, the compiler and the actual ELF file.

Overall the simulator is designed to be as close as possible to a "Golden Truth" that the hardware and software teams can use to verify correctness of the code. The more sophisticated the checks/assertions, the more certainty can be achieved on the validator's correctness. Also, the hardware is modeled using a network of queues in order to save the state and restart the simulator/validator. In some embodiment employing this queue formalism, a variable can also be trivially modelled as a 0-delay queue, effectively making it possible to also represent (using a queue formalism) the internal state of a node that may change multiple times in a given cycle.

The present disclosure provides a technique of applying intuition and targeted assertions to test the most common use cases of the chip. Given a ground truth state s(t) at time t and a simulator/validator state V(t) at time t, let the probability $P(V(t+1) \neq s(t+1) | V(t) = s(t))$ be the probability of a bug in the output state of the simulator appearing at time t+1. If $P(S'(t+1) | S'(t) = s(t))$ is the probability of observing state S'(t+1) in the hardware implementation that it is being tested against, the probability that there is a bug in the hardware implementation that is not picked up by the validator at time t+1 (because both validator and HW give same mistaken result) is:

$$\sum_{e \neq s(t+1)} P(V(t+1) = e, S'(t+1) = e | V(t) = s(t), S'(t) = s(t)).$$

If statistical independence is assumed in the development of the hardware implementation vs the software validator (i.e., mistakes in HW implementation do not affect the emergence of mistakes in the validator implementation or V(t) ⊥ S'(t)) then the following can be established:

$$P(V(t+1)=e,S'(t+1)=e|V(t)=s(t),S'(t)=s(t))=$$
$$P(V(t+1)=e|V(t)=s(t)) \times P(S'(t+1)=e|S'(t)=s(t))$$

which indicates that an improvement in the accuracy of the validator can lead to an improvement in the overall accuracy of the Verilog implementation. That is, the aim is for the validator and hardware implementation to fail independently, hence, the importance when co-designing complex hardware of incorporating mechanisms for ensuring high reliability in the software implementation. This complexity is demonstrated by attempting to enumerate the entire state space of NothPole, as it is an intractable problem:

Number of atoms in the universe: ~10^400
 The number of NothPole states is significantly higher (256 cores, where each core has 64 32-bit registers, 10 threads, each thread with 64-16 bit ops, etc.).

Accordingly, the present disclosure implements the validator carefully to minimize number of bugs at the source. In one aspect, this incorporates in the above mentioned network of queues simulation methodologies for comparing the state across time. This can be accomplished, e.g., by appending to each new queue element X the metadata associated with all the upstream queues that feed into it, and thereby building assertions that depend on current and past state (e.g., Vertical Assertions). The hierarchical structure of the simulator also allows for the creation of Horizontal Assertions comparing the state of physically distant components (e.g., compare the state of a Vector Matrix Multiplier (VMM) unit with the contents of the Partial Sum Memory). Thus, the present disclosure provides a mechanism for "tagging" data at any one cycle and tracing this tagged data across time to be able to track how the tagged data propagates, and does not apply just to NorthPole architecture, but is equally applicable to any complex AI chip development effort.

Figure 6:
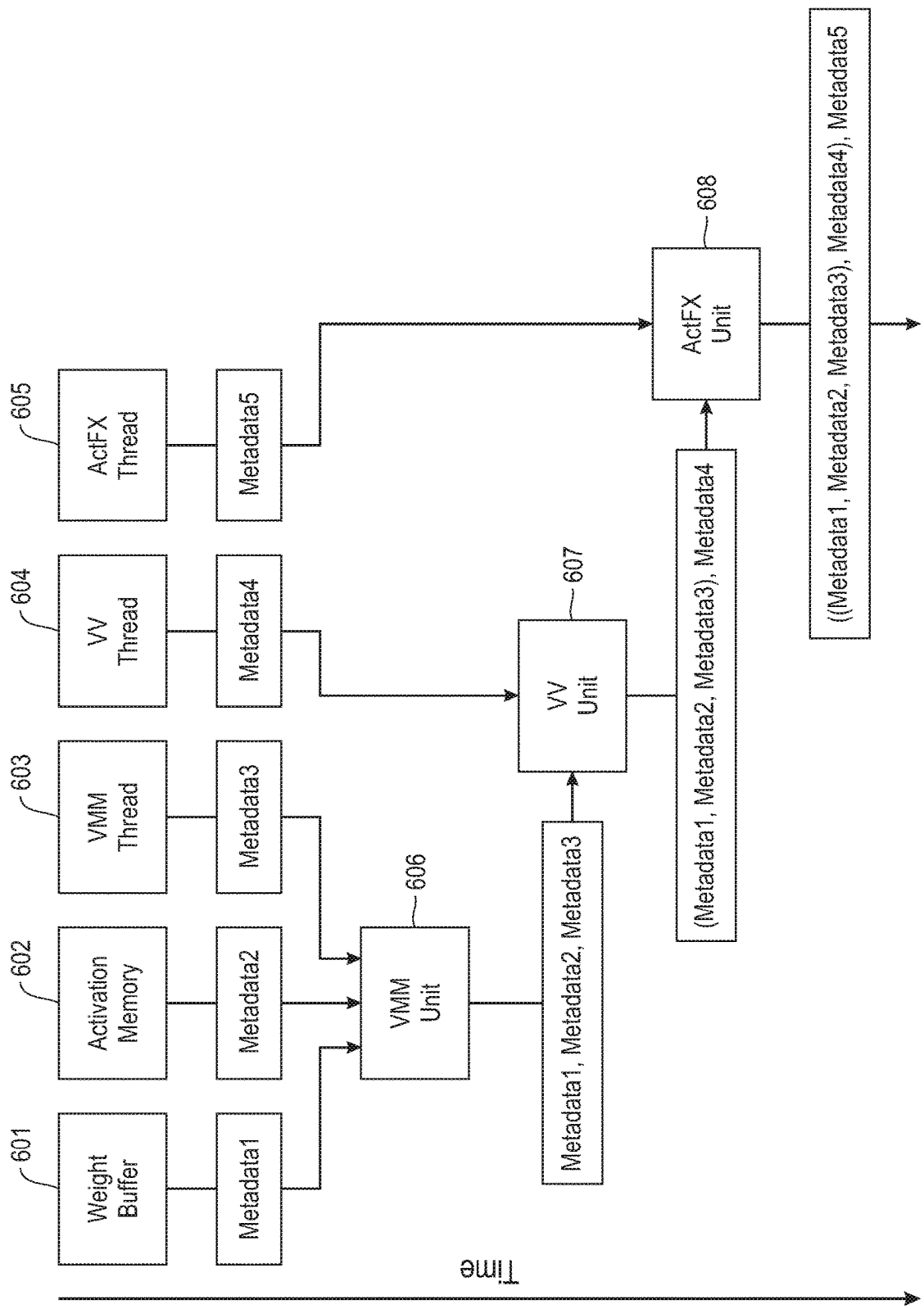
FIG. 6 is an exemplary schematic view of vertical assertions, according to embodiments of the present disclosure.

FIG. 6 depicts an exemplary embodiment of a vertical assertion, which appends each queue element with user defined metadata that is useful for defining assertions. This can include, e.g., the cycle number when that queue element was first pushed in the queue. Also, the metadata in the input queue of each component 601-608, is appended to the metadata of the component's output queue, as shown on the right. The metadata in each component can be used inside each component 601-608 to define assertions, checking the past behavior/past state—as encoded in the metadata—with the current expected state inside the component 601-608. Thus, the metadata is processed over time so a user can selectively choose to compare and retain only a select subset(s) of the metadata, as desired.

Figure 7:
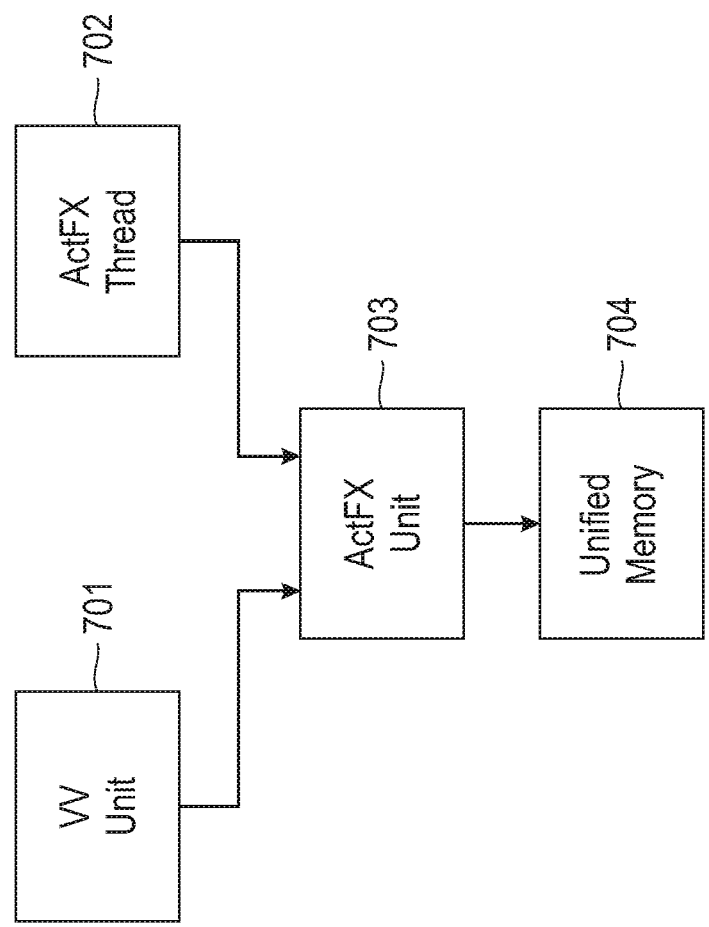
FIG. 7 is an exemplary schematic view of assertion logic during two cycles, according to embodiments of the present disclosure.

FIG. 7 depicts another exemplary embodiment of the present disclosure implementing a Floating Point FP16 bypass mode, where the VectorVector Unit 701 (VV Unit) sends an FP16 value to the Activation Function Unit 703 (ActFX Unit). Over a period of two cycles, the first and second half of the fp16 is written to unified memory 704 by the Activation Function Unit 703. In this exemplary embodiment, it is a specification invariant that the FP16 register in the VectorVector Unit 701 unit holding this value does not get updated during the two cycles, in order to ensure that the same value gets pushed to the Activation Function Unit 703 over two cycles. Also, during the first cycle, the Activation Function Thread 702 (ActFX) needs to send an Operation, but during the second cycle it is supposed to not send an Operation. Accordingly, assertion logic is needed in the Activation Function Unit 703 to check these conditions. Here, the Activation Function Unit 703 cannot simply check that the two values sent by the VectorVector Unit 701 are identical, since it may be the case that the VectorVector Unit 701 simply updated its FP16 register with the same value. Thus, a check is needed to confirm that no updates were made. Accordingly, the VectorVector Unit 701 can send metadata on the last time that the FP16 value it sent was updated. This allows for a vertical assertion to be defined in the Activation Function Unit 703, checking during the second cycle that the FP16 value received is from a VectorVector Unit 701 register that was not updated in the previous cycle.

Figure 8:
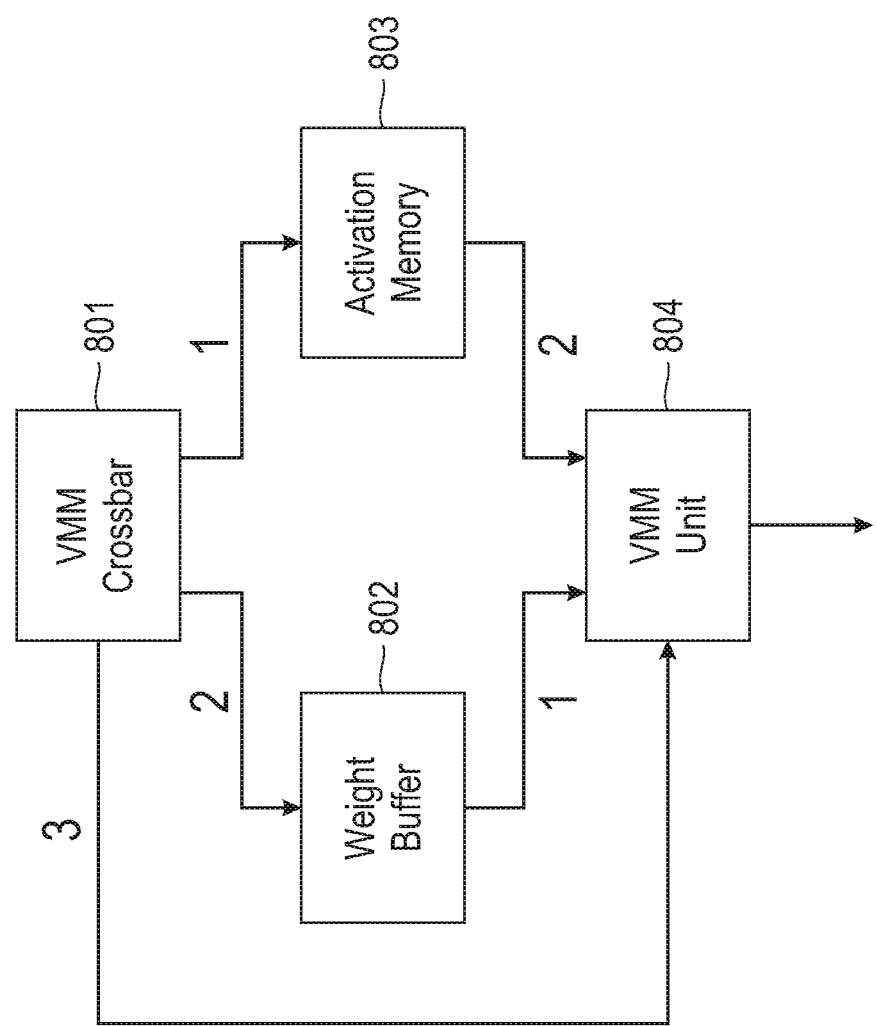
FIG. 8 is an exemplary schematic view of assertion logic during three cycles, according to embodiments of the present disclosure.

FIG. 8 depicts another exemplary embodiment where the Vector Matrix Multiplier Unit Crossbar (VMM Crossbar) 801 initiates a set of address and operations at the same cycle, so that after three cycles a matching triple of information arrives at the Vector Matrix Multiplier Unit (VMM Unit) 804. A set of read addresses arrive at the Weight Buffer 802 and Activation Memory 803 and the extracted data from the memories arrives at the Vector Matrix Multiplier Unit (VMM Unit) 804. Also the Vector Matrix Multiplier Unit Crossbar (VMM Crossbar) 801 sends an operation directly to the Vector Matrix Multiplier Unit (VMM Unit) 804. From the Vector Matrix Multiplier Unit (VMM Unit) 804 perspective, it can be difficult to ensure that all three pieces of input data received have not been corrupted and are correct (e.g. corruption could be the result of a race condition, or a pointer accessing an improper memory region and corrupting the weight buffer).

Thus, by sending metadata down the queues, containing the cycle number when each piece of attached metadata was pushed in the queue, the Vector Matrix Multiplier Unit (VMM Unit) 804 can ensure that all three input it receives correspond to the same three outputs (2 addresses and 1 Operation) produced by the Vector Matrix Multiplier Unit Crossbar (VMM Crossbar) 801 three cycles ago. Additionally, by attaching a hash-string as metadata (such as the MD5 hash of the Weight matrix or the Activation data) and regenerating new hash strings at each component based on it input hash strings, the final output data produced can be verified as being the result of the composition of all upstream hash strings. Thus, the present disclosure provides a trace and validation of the processing pipeline. Similarly, before a read or write is done in a memory, a check, via assertions, can be performed that the MD5 hash string remains unchanged since the last memory update, in order to check for data corruption.

Figure 9:
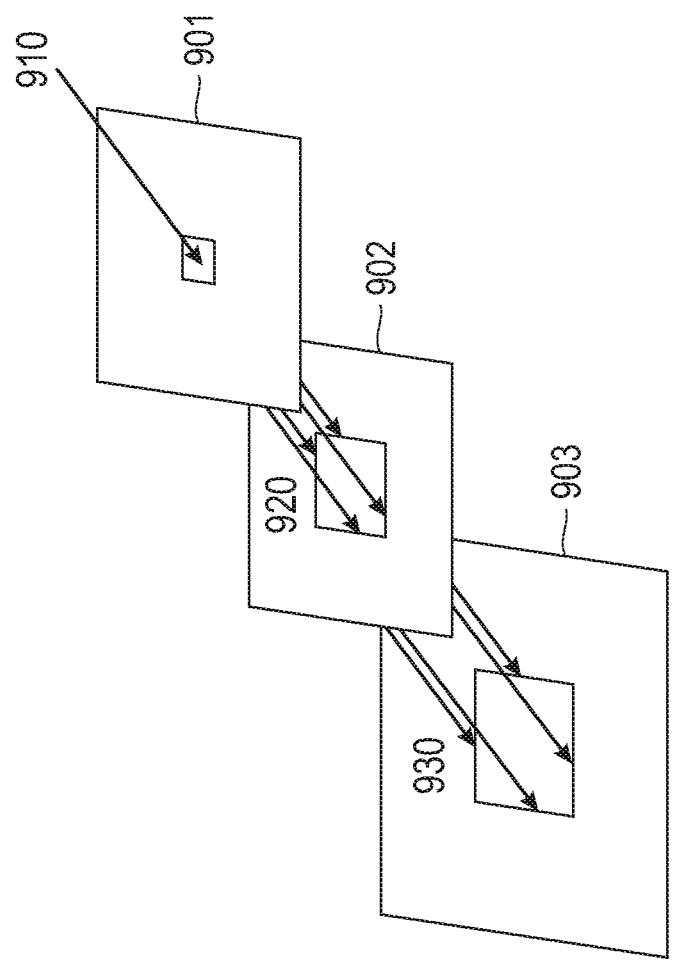
FIG. 9 is an exemplary schematic view of a trace for a certain activation pixel in a layer, according to embodiments of the present disclosure.

FIG. 9 depicts another aspect of the present disclosure which provides a visualization of a trace for a certain activation pixel in a layer, as well as indicating which pixels it affects upstream, or which pixels in previous layers affected the pixel of interest. This visualization feature of the present disclosure has applications which can help create visualizations of a deep network or help an algorithm developer understand why he/she is observing certain results. Advantageously, this can be performed in the validator, by tagging with metadata, the queue elements corresponding to the original pixel, and then propagating that metadata down other queues to trace which activation pixels in other layers it affects. Accordingly, this extends the capabilities of hardware, since it is not straightforward how such a trace could be done directly in hardware.

In the exemplary embodiment shown in FIG. 9, three layers 901-903 are depicted with a pixel of interest 910 identified in the first/top layer 901. The propagation of that first pixel 910 onto the second/intermediate/subsequent layer 902 is shown with the enlarged pixel 920 (with the enlarged size relative to pixel 910 indicating the acquisition of additional metadata). Further, pixel 920 can be mapped or traced to the following layer 903 to reveal the impact of layers 901 and 902 on the enlarged pixel 930. This tracing can be done forward or backward with respect to time, and/or upwardly or downwardly with respect to the tiered layers depicted in FIG. 9.

Thus the present disclosure employs assertions in software code to debug neuromorphic hardware using a co-designed network of queues simulation of the hardware. The ability to tag a single spike/packet, at any point in the pipeline, and trace on a per cycle basis how it affects every single other module upstream, or downstream, provides for a plethora of checks/assertions for validating hardware correctness as well as other algorithmic development purposes as described herein.

Figure 10:
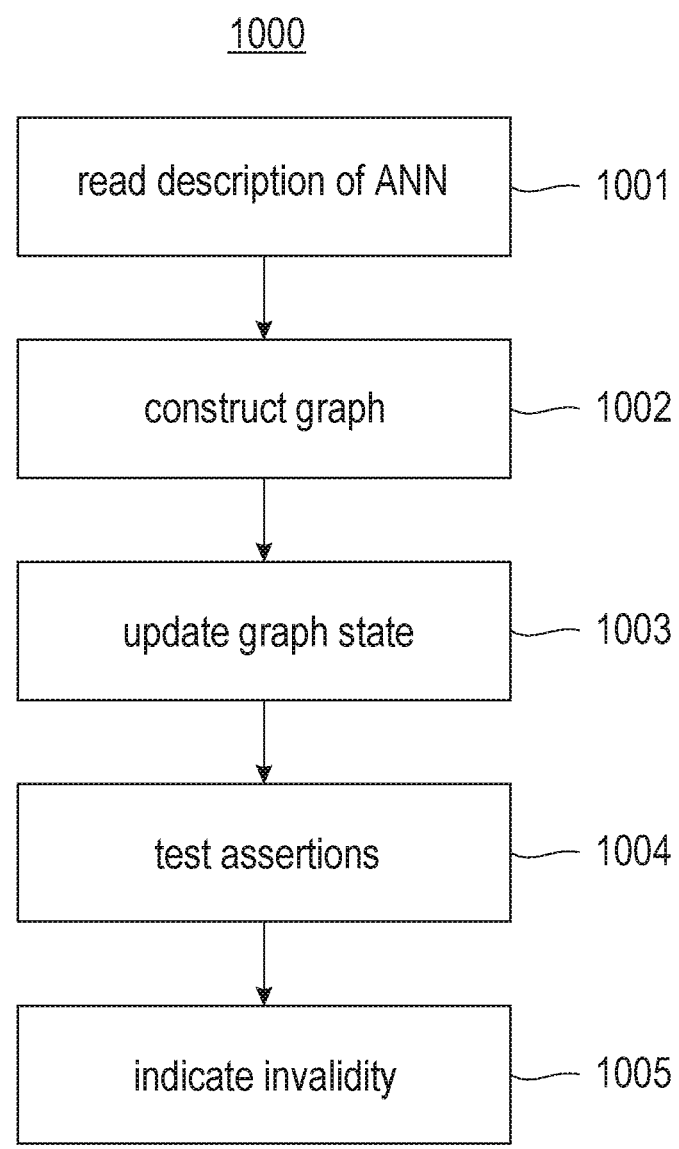
FIG. 10 illustrates a method for simulating and validating a neural network system according to embodiments of the present disclosure.

FIG. 10 contains a flowchart 1000 illustrating a method of simulating and validating a neural network system according to embodiments of the present disclosure. At 1001, a description of an artificial neural network is read. At 1002, a directed graph is constructed comprising a plurality of edges and a plurality of nodes, each of the plurality of edges corresponding to a queue and each of the plurality of nodes corresponding to a computing function of the neural network system. At 1003, a graph state is updated over a plurality of time steps according to the description of the neural network, the graph state being defined by the contents of each of the plurality of queues. At 1004, each of a plurality of assertions is tested at each of the plurality of time steps, each of the plurality of assertions being a function of a subset of the graph state. At 1005, invalidity of the neural network system is indicated for each violation of one of the plurality of assertions.

Figure 11:
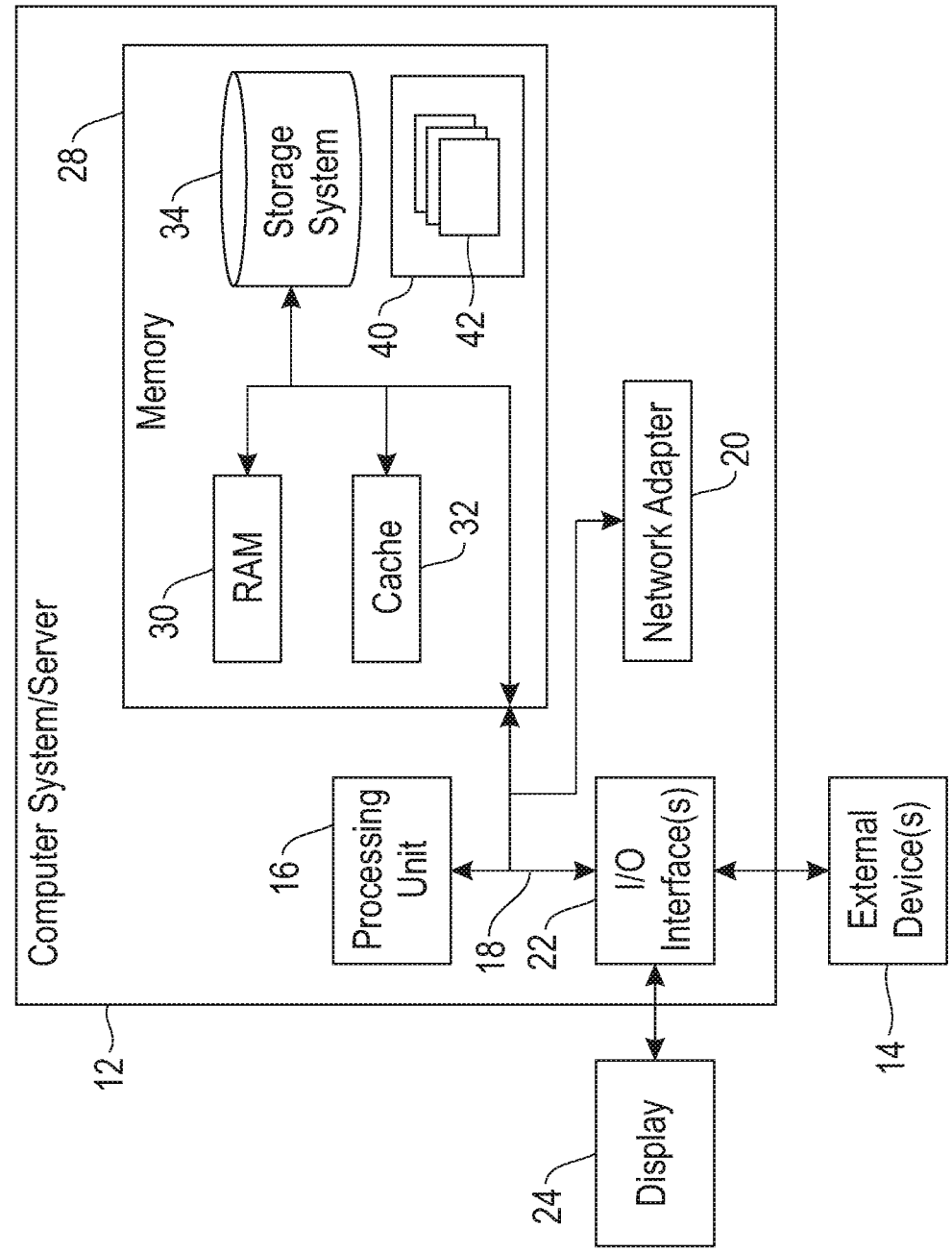
FIG. 11 depicts a computing node according to an embodiment of the present disclosure.

Referring now to FIG. 11, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

In various embodiments, one or more inference processing unit (not pictured) is coupled to bus 18. In such embodiments, an IPU may receive data from or write data to memory 28 via bus 18. Likewise, an IPU may interact with other components via bus 18 as described herein.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of simulating and validating neuromorphic hardware, the method comprising:
    reading a description of an artificial neural network;
    constructing a directed graph comprising a plurality of edges and a plurality of nodes, each of the plurality of edges corresponding to a queue of a plurality of queues and each of the plurality of nodes corresponding to a computing component of a neuromorphic hardware system, the computing components comprising at least one of a vector-matrix multiply unit, a vector-vector unit, and an activation function unit, each of the computing components being configured to compute a computing function;
    updating a graph state over a plurality of time steps according to the description of the artificial neural network, the graph state being defined by contents of each of the plurality of queues;
    testing each of a plurality of assertions at each of the plurality of time steps, each of the plurality of assertions being a function of a subset of the graph state;
    indicating invalidity of the neuromorphic hardware system for each violation of one of the plurality of assertions.

2. The method of claim 1, wherein each of the plurality of queues corresponds to a pipeline delay.

3. The method of claim 1, wherein updating the graph state comprises computing for each node the computing function of its associated computing component based on a current or past graph state transmitted via the plurality of queues.

4. The method of claim 1, further comprising:
    outputting a result of each of the plurality of computing functions at each time step.

5. The method of claim 1, wherein the directed graph provides a cycle-accurate model of the neuromorphic hardware system.

6. The method of claim 1, further comprising:
    appending queue metadata to each queue at each time step.

7. The method of claim 6, further comprising:
    testing a plurality of assertions against the metadata.

8. The method of claim 6, wherein the neuromorphic hardware system lacks data dependent branching.

9. The method of claim 6, wherein the queue metadata is a function of the data provided by the head of each inbound queue to its respective node.

10. A computer program product for validating neuromorphic hardware, the computer program product comprising a computer readable storage medium having program instructions embodied therewith, the program instructions executable by a processor to cause the processor to perform a method comprising:
    reading a description of an artificial neural network;
    constructing a directed graph of queues comprising a plurality of edges and a plurality of nodes, each of the plurality of edges corresponding to a queue of a plurality of queues and each of the plurality of nodes corresponding to a computing component of the neuromorphic hardware system, the computing components comprising at least one of a vector-matrix multiply unit, a vector-vector unit, and an activation function unit, each of the computing components being configured to compute a computing function;
    updating the graph state over a plurality of time steps according to the description of the neural network, the graph state being defined by contents of each of the plurality of queues;
    testing each of a plurality of assertions at each of the plurality of time steps, each of the plurality of assertions being a function of a subset of the graph state;
    indicating invalidity of the neural network system for each violation of one of the plurality of assertions.

11. The computer program product of claim 10, wherein each of the plurality of queues corresponds to a pipeline delay.

12. The computer program product of claim 10, wherein updating the graph state comprises computing for each node the computing function of its associated computing component based on a current or past graph state transmitted via the plurality of queues.

13. The computer program product of claim 10, further comprising:
    outputting a result of each of the plurality of computing functions at each time step.

14. The computer program product of claim 10, wherein the directed graph provides a cycle-accurate model of the neuromorphic hardware system.

15. The computer program product of claim 10, further comprising:
    appending queue metadata at each queue at each time step.

16. The computer program product of claim 15, further comprising:
    storing the queue metadata to a computer storage medium.

17. The computer program product of claim 15, further comprising:
    testing a plurality of assertions against the metadata.

18. The computer program product of claim 10, wherein the plurality of assertions are specified prior to runtime.

19. The computer program product of claim 14, wherein the neuromorphic hardware system lacks data dependent branching.

20. The computer program product of claim 15, wherein the queue metadata is a function of data provided by a head of each inbound queue to its respective node.

* * * * *